July 17, 1956 W. L. PRINGLE 2,754,695
SHIFT CONTROL MECHANISM
Filed Sept. 25, 1951 4 Sheets-Sheet 1
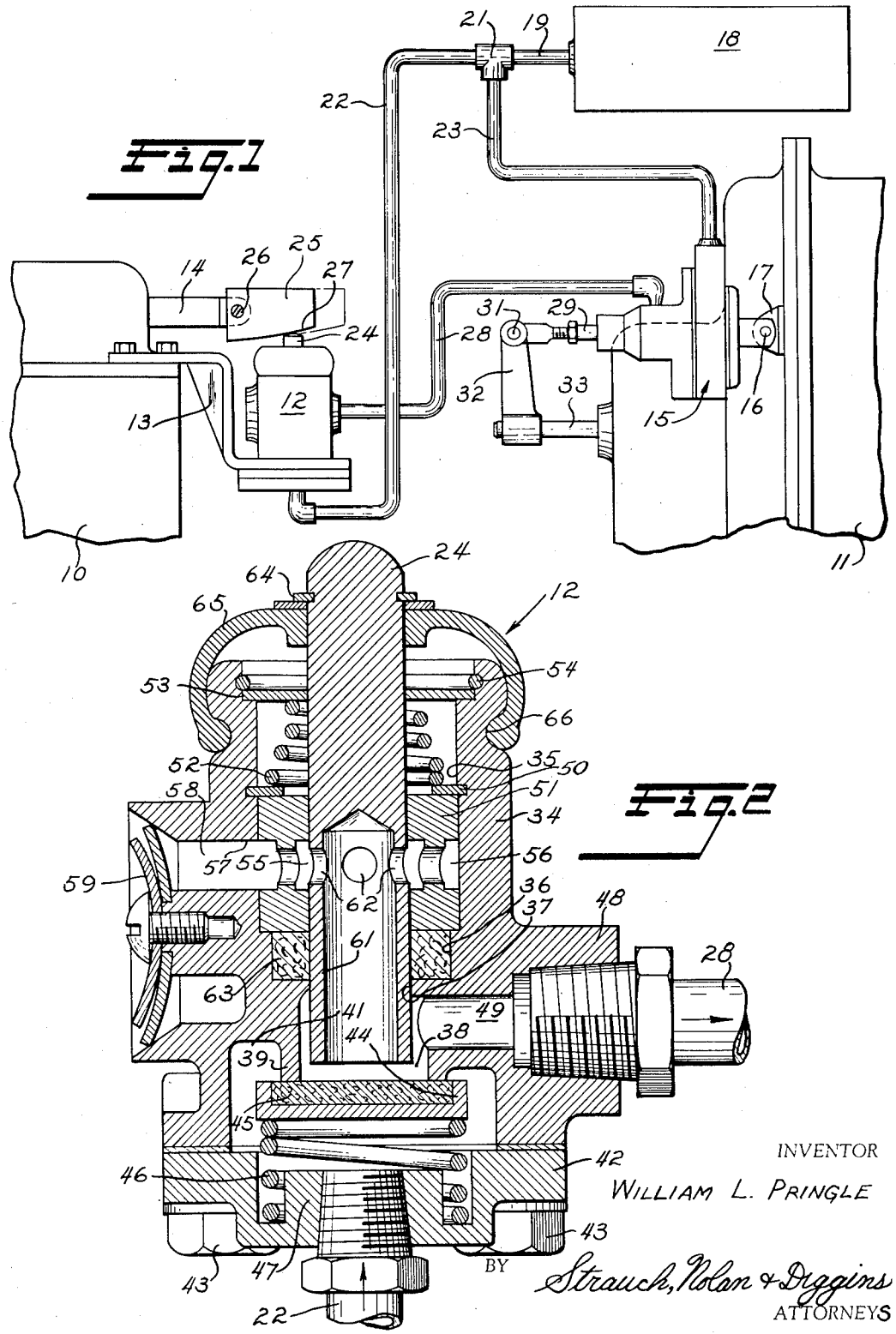
INVENTOR
WILLIAM L. PRINGLE
BY Strauch, Nolan & Diggins
ATTORNEYS

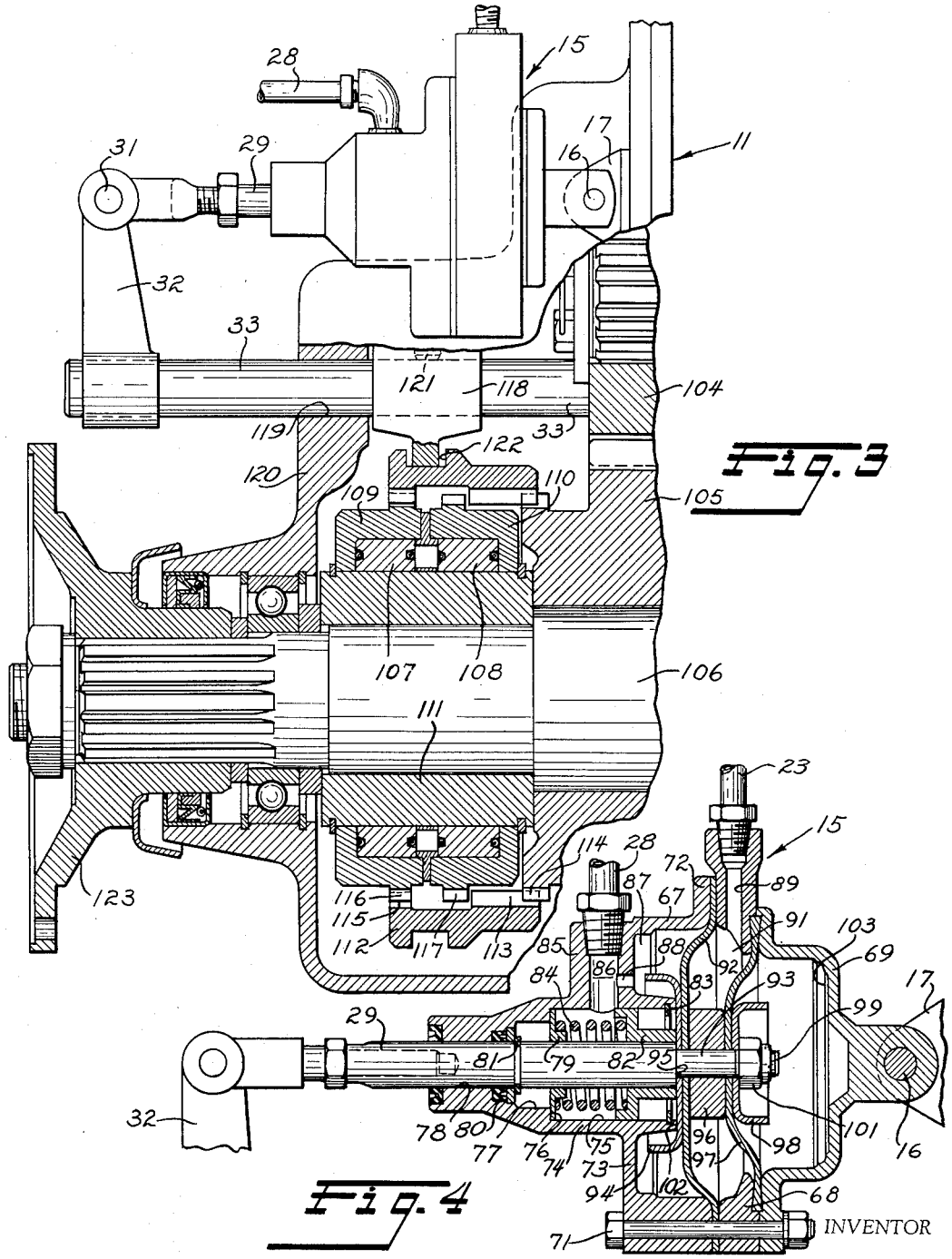

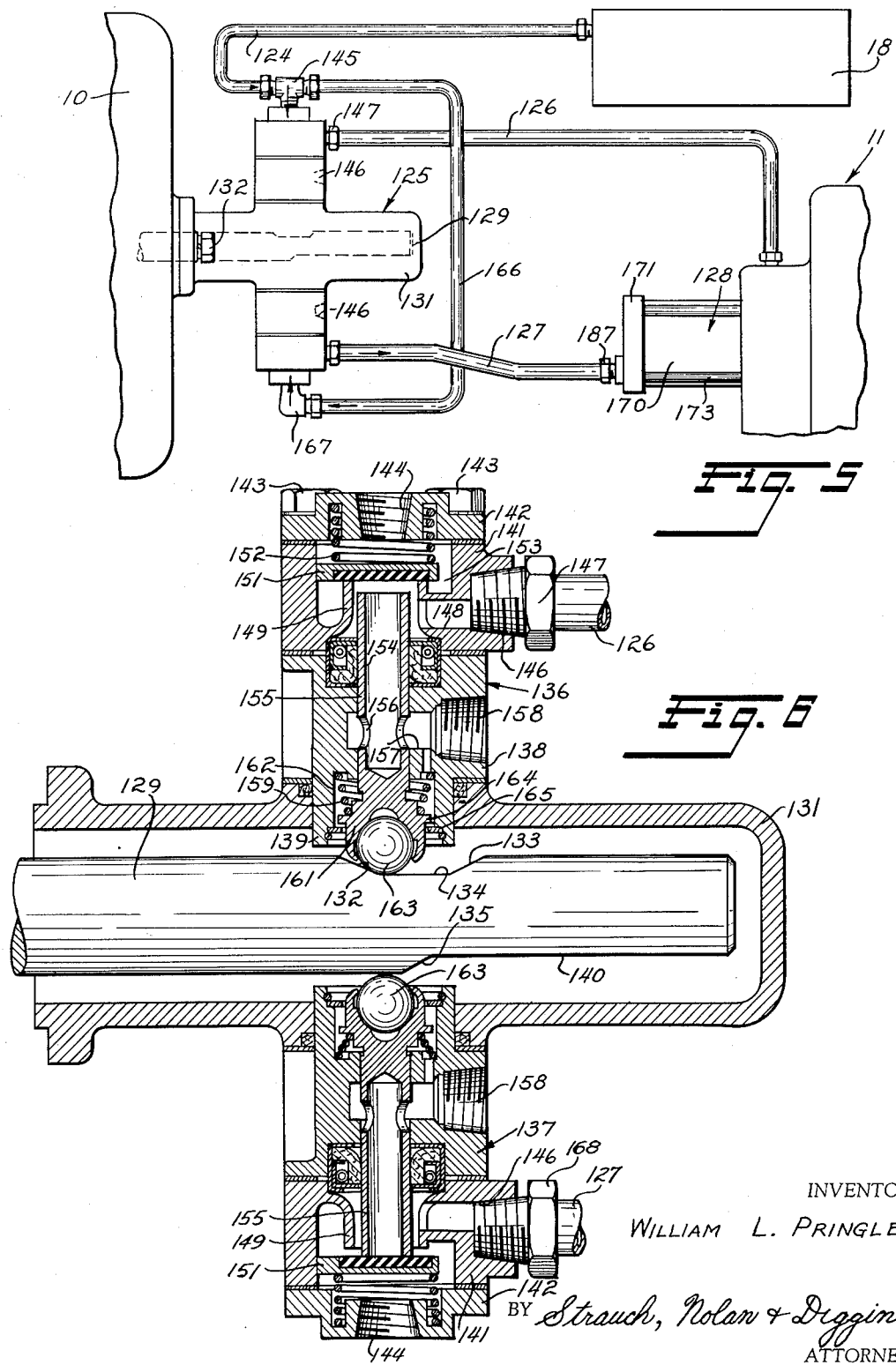

July 17, 1956     W. L. PRINGLE     2,754,695
SHIFT CONTROL MECHANISM

Filed Sept. 25, 1951     4 Sheets-Sheet 4

INVENTOR
WILLIAM L. PRINGLE
BY Strauch, Nolan & Diggins
ATTORNEYS

United States Patent Office 2,754,695
Patented July 17, 1956

2,754,695

SHIFT CONTROL MECHANISM

William L. Pringle, Detroit, Mich., assignor, by mesne assignments, to Rockwell Spring and Axle Company, Coraopolis, Pa., a corporation of Pennsylvania Application September 25, 1951, Serial No. 248,240

21 Claims. (Cl. 74—745)

This invention relates to clutch or gear shift controls and particularly to power operated selection of the drive to an auxiliary drive axle in a multi-axle drive vehicle.

The present invention will be described as applied to shift mechanism for connecting the output of a transfer case to the propeller shaft of a front drive axle, and in its specific embodiment will be described as adapted to the shifting of a clutch collar in an overrunning clutch in the drive to the front axle of a multi-axle drive vehicle such as that disclosed and claimed in Buckendale application Serial No. 202,103 filed December 21, 1950, but the invention is not limited to any such specific arrangement. For example it may be applied to a power take-off shaft.

The power operated shift mechanism of the invention is intended to improve over prior mechanical linkage mechanisms hitherto employed for the purpose, and includes novel association with the main transmission controls as will appear.

It is difficult to provide a reliable mechanical motion transmitting linkage between two relatively moving mechanisms, such as between the change speed gear box or main transmission of the vehicle and the transfer case, which are independently and sometimes flexibly mounted on the vehicle frame. Torque and thrust reaction of gears and bearings is transmitted to the gear boxes and causes respective movements. When this occurs, either the mechanical linkage may be distorted or a partial shift may occur. When play is intentionally provided in the linkage, control of the shift becomes difficult and over-shifting or under-shifting may result from the inability to obtain accurate adjustment. A further disadvantage of mechanical linkages is the large space required for levers, bushings, bell cranks, springs and other parts. Often in heavy duty equipment, space is so limited that mechanical linkage of adequate strength or size cannot be utilized. Mechanical linkage is also susceptible to damage from road hazards, such as flying or falling objects, and lubrication of mechanical linkages is difficult in close quarters and is frequently overlooked with consequent eventual failure.

It is a major object of this invention to provide a novel compact, inexpensive and reliable drive member shifting mechanism that requires a minimum of space and maintenance.

Another object of the invention is to provide in a motor vehicle a novel automatic shifting mechanism that is positive and precise in its control and more reliable than conventional mechanical linkages.

It is another object of the invention to provide power shift mechanism wherein a control valve is actuated by the reverse shift rail of a vehicle transmission so as to automatically regulate the application of fluid pressure to the shift mechanism.

A further object of the invention is to provide a novel self centering two-way shift cylinder or other power responsive element that will positively and automatically shift an auxiliary drive axle mechanism to an intermediate or neutral position whenever there is a loss of fluid pressure or vacuum in the shift mechanism, thereby preventing windup between the axles.

A still further object of the invention is to provide a novel fluid responsive shift control device having preloaded springs to center a two-way shift cylinder or the power responsive element.

These and other objects of this invention will become apparent as the description proceeds in connection with the accompanying drawing wherein like reference numerals have been used to designate like parts and wherein:

Figure 1 is a schematic view of the shift control showing the relation of its major parts;

Figure 2 is an enlarged view in section of one form of the shift cylinder control valve;

Figure 3 is a fragmentary sectional view of part of a transfer case illustrating the operative connection to the shift cylinder according to a preferred embodiment of the invention;

Figure 4 is an enlarged sectional view of the shift motor;

Figure 5 is a schematic view of a shift control according to a further embodiment of the invention;

Figure 6 is an enlarged section illustrating another type of control valve used in the embodiment of Figure 5.

Figure 7:
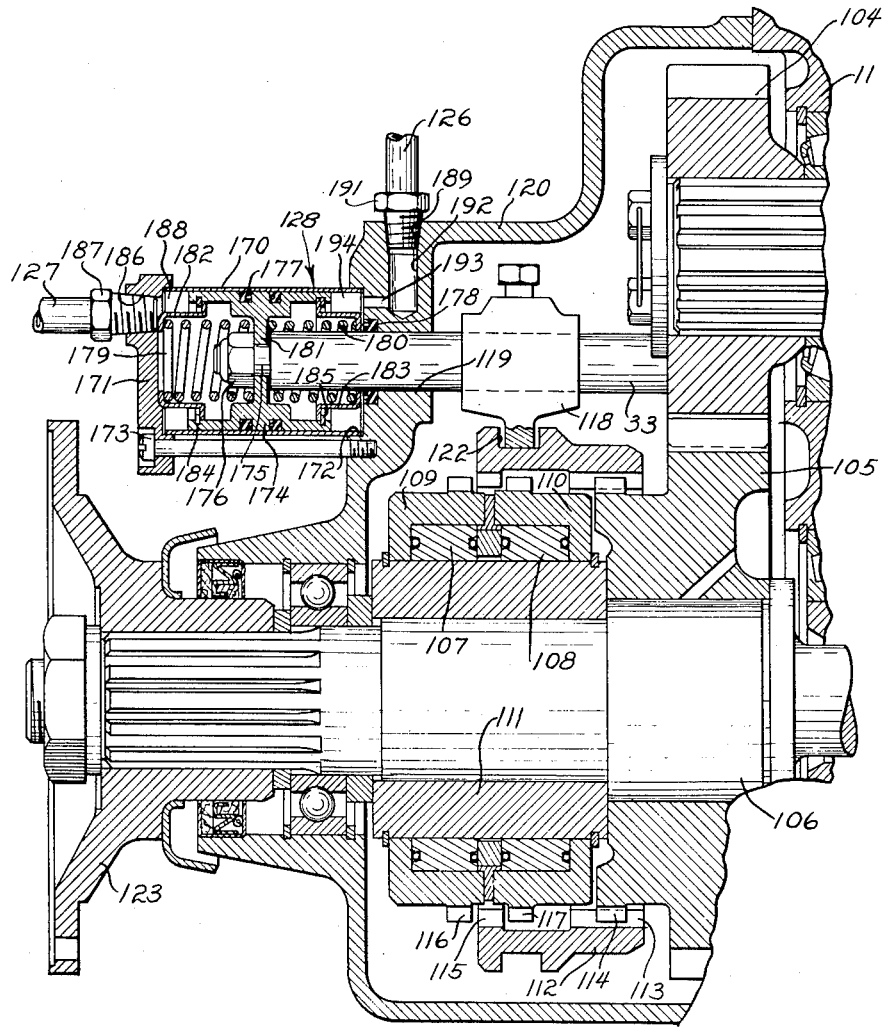
Figure 7 illustrates the shift cylinder structure of Figure 5 as applied to the transfer case.

Referring now to Figure 1, a schematic diagram for a system utilizing air pressure is shown, wherein a conventional variable speed gearing transmission 10 and a transfer case assembly 11 are provided with the shift mechanism of the invention in special association. A control valve assembly 12 is mounted on the housing of transmission 10 as by a bracket 13 in operative connection with the reciprocable reverse shift rail 14 as will appear.

A shift motor assembly 15 is mounted on the housing of transfer case 11. Preferably the casing of motor 15 is pivoted at 16 to a bracket 17 rigidly secured as by bolting to the transfer case.

A tank 18 on the vehicle serves as a source of compressed air. Its outlet conduit 19 enters a fitting 21 from which extend supply conduits 22 and 23 to the control valve assembly and shift motor respectively.

Transmission rail 14 is the usual reciprocable rail provided in the conventional transmission which is located in the full line position of Figure 1 whenever the vehicle transmission is in the various forward drive speeds of the vehicle, and is in the dotted line position of Figure 1 only when the transmission 10 has been shifted into reverse.

Valve assembly 12 has a projecting reciprocable plunger 24 actuated by a cam 25 secured to rail 14 as by bolt 26 and having an inclined surface 27 for engaging and depressing the plunger 24. A conduit 28 extends from control valve 12 to motor 15, and it supplies air to the side of a pressure responsive element opposite from conduit 23 as will appear.

Motor 15 has a projecting reciprocable rod 29 pivotally attached at 31 by a pin, slot and clevis connection to the upper end of an arm 32 rigid with a reciprocable clutch shift shaft 33 projecting horizontally from the transfer case housing.

Referring now to Figure 2, control valve assembly 12 comprises a housing 34 provided with a vertical upwardly open cylindrical bore 35 having a reduced lower portion 36. The bottom of the bore is formed with a reduced aperture 37 opening into a chamber 38, and an annular valve seat for the chamber 38 is provided by an annular lip 39 projecting into an annular end recess 41 in the casing.

A cover 42 secured to casing 34 as by bolts 43 closes recess 41. A cup-shaped metal valve seat element 44 having a disc of flexible material 45 adapted to engage lip 39 is urged toward lip 39 by a compressed spring 46 piloted on a hollow boss 47 on cover 42. Boss 47 is internally threaded for attachment of a fitting to compressed air inlet conduit 22. Thus when cover 42 is secured on the casing, it compresses spring 46 to normally seat valve element 44 on lip 39 to close fluid communication between chamber 38 and the inlet conduit 22.

One side of casing 34 is formed with a hollow internally threaded boss 48 for attachment of a fitting to outlet conduit 28, so that chamber 38 is always open to the outlet conduit 28 through connecting passage 49.

An annular exhaust valve member 51 is seated in bore 35, being held upon the bottom of the bore by a split snap ring and groove assembly 50, and a compression spring 52 reacting between ring 50 and an annular washer 53 held against outward axial displacement by a split snap ring and groove arrangement at 54.

Valve member 51 is formed with a series of radial ports 55 communicating with an annular surface recess 56 that is intersected by a radial casing passage 57 opening outwardly to an annular exhaust port 58 normally covered by a suitable air filter assembly 59.

Plunger 24 is formed with a bore 61 in its inner end and a plurality of radial ports 62 that align with ports 55 when the plunger is in its Figure 2 position, so that conduit 28 is thus connected to atmosphere. A seal 63 in the reduced lower portion of the bore surrounds plunger 24 and prevents passage of air through aperture 37.

The upper end of plunger 24 is fixed as by washer and snap rings 64 to the inner periphery of a flexible dome 65 that has its outer periphery secured in a groove 66 in casing 34. Dome 65 thus functions to close the upper end of bore 35 and as a spring to normally maintain plunger 24 in its Figure 2 position, with the lower end of plunger 24 spaced above the valve element 44.

In operation, whenever the transmission 10 is placed in reverse, cam face 27 rides over the rounded upper end of plunger 24 to depress the plunger sufficiently to engage valve element 44 and unseat it from the lip 39. This places outlet conduit 28 in connection with the source of air under pressure. At the same time, ports 62 are moved out of registry with ports 55 so that the exhaust port is closed and no air under pressure can escape casing 34 except through conduit 28.

Referring now to Figure 4, the shift motor assembly 15 comprises a three part casing consisting of a body 67, a ring 68 and a cap 69 all secured together rigidly as by bolts 71. Body 67 is generally cup-shaped with a flange 72 extending about its open end. Ring 68 is clamped between flange 72 and cap 69.

At its other end body 67 has a wall 73 centrally apertured and having an integral hollow boss 74 projecting both interiorly and exteriorly of the wall. The interior of boss 74 comprises a cylindrical bore 75 having at its outer end a flat radial shoulder 76, a reduced bore 77 and a further reduced end bore 78, the latter for slidably mounting rod 29.

A washer 79 seated on shoulder 76 surrounds rod 29. A fixed stop 80 on the body coacts with snap ring 81 on the rod to limit outward movement of rod 29. A collar 82 is slidably mounted within bore 75 surrounding rod 29 and is limited in its axial inward displacement by snap ring 83 on the body. A coiled spring 84 compressed between washer 79 and collar 82 normally urges these members apart. Collar 82 also functions as a piston as will appear. Wall 73 is formed with a hollow boss 85 threaded for attachment of a fitting to conduit 28 and having a passage 86 leading to bore 75 between the washer and collar 82. One motor diaphragm chamber 87 is connected to passage 86 by a reduced passage 88.

Ring 68 is formed with a radial passage 89 threaded at its outer end for reception of a fitting for conduit 23.

The outer motor diaphragm chamber 91 is surrounded by ring 68 and communicates with passage 89. A flexible motor diaphragm 92 has its periphery clamped fluid tight between flange 72 and ring 68. The central portion of motor diaphragm 92 is apertured to pass a reduced end 93 of rod 29 and is clamped between a pan 94 seated against radial shoulder 95 on rod 29 and a spacer block 96 mounted on rod end 93.

A sealing diaphragm 97 has its periphery clamped fluid tight between ring 68 and cap 69. The central portion of seal diaphragm 97 is clamped between spacer block 96 and a pan 98 that is mounted on the threaded end 99 of rod portion 93. When nut 101 is drawn tight the pans, diaphragms and spacer block are drawn into tight assembly, being centrally solid between shoulder 95 and nut 101. Diaphram 97 closes the outer end of motor chamber 91.

When chamber 91 is subjected to the air pressure of reservoir 18, and the valve assembly 12 is in the position of Figure 2, the motor parts are in the position of Figure 4, wherein the rod 29 is at its limit position to the left and pan 94 abuts the inner end face 102 of boss 74. With fluid pressure applied only to chamber 91, the movable structure of this motor is pneumatically biased to the left as viewed in Figure 4 under a force equal to the product of the applied fluid pressure and the net effective area of diaphragms 92 and 97, such net effective area being equal to the difference between the effective area of diaphragm 92 between its central and peripheral clamped portions and the effective area of the smaller diaphragm 97 between its central and peripheral clamped portions. Spring 84 is compressed. When valve 12 is opened by cam 25, the motor parts move to the right in Figure 4, with rod 29 at its right hand limit of shift, and with pan 98 abutting stop face 103 on cap 69. This movement results from the establishment in chamber 87 and bore 75 of a fluid pressure equal to that in chamber 91 and from the fact that the effective area of diaphragm 92 exposed to the influence of pressure through passage 86 is greater than the net effective area of the diaphragms 92 and 97 in chamber 91. The resultant force exerted upon the movable motor parts when both chambers 91 and 87 are pressurized pneumatically biases these parts to the right in Figure 4. These are the two normal operative positions of the motor.

In the transfer case assembly 11 (Figure 3) a power driven spur gear 104 is in constant mesh with and drives a spur gear 105 rotatably mounted on a front power output or auxiliary drive axle drive shaft 106. A pair of sprag clutches 107 and 108, unidirectional in opposite directions, have their respective clutch drums 109 and 110 mounted on a collar 111 fixed on shaft 106 forwardly of gear 105. An axially slidable clutch collar 112 has at one end an internally splined portion providing clutch teeth 113 meshed with and slidable on a row of clutch teeth 114 on a forward extension of the hub of gear 105. A shorter internal row of clutch teeth 115 is formed within clutch collar 112 at its other end and spaced from splined portion 113, and the clutch drums 109 and 110 are provided with external rows of clutch teeth 116 and 117 adapted to be selectively engaged by internal teeth 115 of the clutch collar. Clutch teeth 113 are long enough to retain mesh with teeth 114 in all positions of collar 112. A fork 118 is fixed to reciprocable shift shaft 33 as by set screw 121 and engages an annular groove 122 on the exterior of clutch collar 112 so that collar 112 may be shifted axially relative to shaft 106 by axial movement of shift shaft 33. Shift shaft 33 which is slidable in a bore 119 in clutch housing 120 is mounted for axial reciprocation on the casing of transfer case by suitable means at is inner end (not shown), and is positioned automatically by the connecting control system from the transmission unit 10 as will be explained in detail hereinafter.

The clutch collar 112 may be shifted between either of two positions, one in which the internal row of teeth 115 mesh with drum teeth 116 to establish a one-way drive connection between clutch 107 and gear 105 for a forward drive to the front axle as shown in Figure 3, or the other in which teeth 115 mesh with drum teeth 117 to establish a one-way driving connection between gear 105 and clutch 108 for reverse drive to the front axle.

Should there for any reason be a failure of the fluid under pressure from tank 18, such as a broken line 19, 22 or 23, or, in the event that vacuum power is employed, a failure of the vacuum, the above described apparatus is such as to automatically shift clutch collar 112 to a neutral position where teeth 115 are disposed in the space between teeth 116 and 117 and out of engagement with both.

When such failure of power occurs, both sides of the diaphragm 92 are subjected to atmospheric pressure and the diaphragm centers itself in the intermediate position determined by the expansion of spring 84.

This release of power to obtain a neutral position of the clutch may be effected deliberately, as by providing a shut-off valve at 21 which also provides a vent to atmosphere for lines 22 and 23, and is an important provision for handling the vehicle under certain non-drive conditions as during loading and unloading for shipment.

The gearing and gear ratios within the transfer case are preferably as disclosed in said Buckendale application, but it will be understood that the basic shift arrangement of the invention is applicable to any clutch of this type. In this embodiment of the invention, flange 123 which is splined onto the forwarding projecting end of shaft 106 is connected by a suitable propeller shaft to the front drive axle of a six wheel drive truck having tandem rear drive axles as in said application.

In operation, when the vehicle is being driven in a forward direction, the parts are disposed as in Figures 1–4, the shift rail 14 being in its leftward position so that cam 25 is clear of plunger 24. Under these conditions, the motor chamber 91 contains air under pressure from conduit 23 and reservoir 18, and the motor diaphragm is in its Figure 4 position since motor chamber 87 is vented to atmosphere through conduit 28, valve chamber 38 and the exhaust port at 58. Shaft 33 is therefore maintained in its limit position to the left in Figure 3, with gear 105 clutched to drum 109 for forward drive of the shaft 106.

In the disclosed embodiment the gear ratios are such that the rear axle wheels are driven slightly faster than gear 105 so that under normal road conditions, shaft 106, due to friction between the front axle wheels and the road, rotates faster than gear 105 and hence is not driven thereby. When the rear wheels slip until rotation of shaft 106 reduces to the speed of gear 105, then a drive relation is established through clutch 107. However, the invention is equally applicable to a system where drive is always transmitted from gear 105 to shaft 106 in either direction.

The above drive condition exists except when the main transmission is shifted into reverse or there is no pressure from the power source, rail 14 being in the full line position of Figure 1 when the transmission is in forward drive or neutral.

When, and only when, the main transmission is shifted into reverse, rail 14 moves to the right in Figure 1 until cam face 27 engages and depresses plunger 24 sufficiently to open the valve at 44 and close the exhaust passage, thereby transmitting air under pressure from reservoir 18 through conduit 22, recess 41, lip 39, chamber 38, passage 49 and conduit 28 to motor chamber 87 and bore 75. Although the air in both motor chambers 87 and 91 is of the same pressure, the effective area of the diaphragm of the side of chamber 87 is larger than the effective area on the side of chamber 91, and therefore the diaphragm is displaced to the right in Figure 4 until pan 98 contacts stop face 103. The collar 82 acts as a spring biased piston to assist this movement during its early stages but is stopped and retained in bore 75 by ring 83, rod 29 sliding axially through collar 82 to recompress the spring 84. This axial displacement of rod 29 acts through arm 32 to displace shift shaft 33 to the right in Figure 3 until teeth 115 are meshed with teeth 117 and a reverse drive is established between gear 105 and the shaft 106.

When it is desired to return to forward speed, the main transmission is shifted and rail 14 moves to permit valve 12 to resume its Figure 2 position whereby motor chamber 87 is vented and expansion of spring 84 starts the diaphragm toward its leftward position of Figure 4.

In the two operative positions of the diaphragm, spring 84 is compressed or cocked, so that when control valve 12 is actuated the motor response is instantaneous. During the shift from reverse to forward the reduced passage 88 provides a metering action to slow leftward movement of rod 29 and thereby to reduce tendency of clashing of the clutch teeth, and this same metering action is accomplished in the reverse direction of shift since passage 88 slows the admission of air under pressure into chamber 87.

If the air pressure should fail and the motor 15 and clutch collar 112 are in the forward speed position the air within diaphragm motor chamber 91 bleeds out through conduit 23 through the system to the leak. With atmospheric pressure in both motor chambers 87 and 91, the motor 15 will assume its neutral position above described, and shift the clutch collar 112 to its neutral position.

If the motor 15 and clutch collar 112 are in the reverse speed position and the air pressure should fail, the air within diaphragm motor chamber 91 bleeds out through conduit 23 through the system to the leak. The air within diaphragm motor chamber 87 bleeds out through conduit 28 through valve chamber 38 past open seal 45 through conduit 22 through the system to the leak.

In two of the three motor positions, namely the two activated positions, forward speed and reverse, the spring 84 is compressed or cocked so that with a loss of air pressure from the system there is enough force within the spring to shift both the motor 15 and the clutch 112 to the neutral position.

Figures 5–7 illustrate a further embodiment of the invention, wherein the compressed air reservoir is connected by a conduit 124 to a control valve assembly mounted on transmission 10 and indicated at 125, and valve 125 is connected by conduits 126 and 127 to opposite ends of a motor assembly 128 mounted on transfer case 11, for a purpose to appear.

Main transmission 10 comprises a reciprocable shift rail 129 that is the same as rail 14 of Figure 1 in that it has a single position for all forward and neutral positions of the main transmission and another single position for reverse setting of the main transmission. Rail 129 projects into a housing 131 that is secured to the transmission housing as by bolts 132.

Referring to Figure 6, the shift rail 129 is provided with two oppositely inclined faces 132 and 133 spaced by a flat axially extending face 134. Diametrically opposite face 134 is a flat inclined face 135 beyond which the rail is of reduced section.

Projecting from opposite sides of housing 131 are valve arms 136 and 137, each substantially identical in construction, and the same numerals will be used in both. Arm 136 comprises an exhaust port section 138 having a hollow boss 139 piloted in an aperture in casing 131, and a control valve section 141 provided with a cap 142. Sections 138 and 141 and cap 142 are secured together rigidly and on housing 131 by bolts 143.

Cap 142 has a threaded opening 144 to receive fitting 145. Control valve section 141 has a threaded opening 146 for receiving fitting 147 on the end of conduit 126.

Opening 146 is connected by passage 148 to the interior of a hollow valve lip 149. A slidable valve element 151 is urged toward lip 149 by a spring 152 compressed between it and cap 142, so that in the valve arm 136 air under pressure is admitted into chamber 153, but the closed valve at 149, 151 prevents the air under pressure from entering outlet conduit 126.

Conduit 126 is vented to atmosphere through the hollow bore 154 of a plunger 155 slidable in exhaust section 138 and having radial ports 156 communicating with an exhaust chamber 157 having a threaded outlet 158 for a suitable filter that admits atmospheric pressure.

Plunger 155 is urged toward rail 129 by a spring 159 reacting between its plunger head 161 and the base of a spring seating bore 162. A spherical ball 163 is clamped in the plunger head, and in the rail position of Figure 6 ball 163 is seated on low face 134 of the rail. A flange 164 on the plunger coacts with a snap ring assembly 165 to prevent the plunger from leaving its bore.

Thus, as illustrated in Figure 6, in valve arm 136 spring 159 retracts plunger 155 from valve element 151 and therefore its bore serves as a passage between conduit 126 and exhaust port 158. On the other hand ball 163 of the valve plunger in valve arm 137 engages the high spot periphery of rail 129, so that this plunger 155 is seated against valve element 156 to close the exhaust to port 158, and to open conduit 127 to the air under pressure that comes through conduit 166, fitting 167 and threaded opening 144 in the lower cap 142. Conduit 127 is connected to lower exhaust opening 146 by fitting 168.

The motor assembly 128 (Figure 7) consists of a cylinder 170 which is closed at one end by a crosshead 171 and has its other end inserted in a cylindrical recess 172 in housing 120 on the transfer case, recess 172 serving as the other end closure of the cylinder. Screws 173 secure the cylinder on housing 120. Contained within cylinder 170 is a double acting piston 174 centrally secured to the reduced threaded end 175 of the shift shaft 33 as by nut 176. A plurality of resilient piston rings 177 of rubber or the like surround piston 174, and a ring seal 178 surrounds shift shaft 33 to prevent leakage of the fluid. Similar springs 179 and 180 compressed between a center web 181 of piston 174 and retainers 182 and 183 having a sliding fit within piston 174 act to retain and center the piston as will appear. Spring retainers 182 and 183 are thus positioned on piston 174, which is axially movable with respect to them, and snap rings 184 and 185 seated in recess in the inner wall of piston 174 limit the relative movements of piston 174 and retainers 182 and 183. A threaded opening 186 in crosshead 171 receives a fitting 187 attaching conduit 127 to the motor and opening into motor chamber 188 on one side of the piston. A threaded opening 189 for attachment of a fitting 191 connects conduit 126 to the motor and opens to passages 192 and 193 leading to the chamber 194 on the other side of piston 174.

When the transmission shift rail 129 is moved to the position shown in Figure 6, upper valve stem ball 163 rests on face 134 and the associated valve plunger is in exhaust position, maintaining atmospheric pressure in motor chamber 194 (Figure 7). Meanwhile, the lower valve stem ball 163 rests on the outer diameter of the shift rail, thereby connecting conduit 127 to the air pressure of pressure inlet conduit 166 and admitting air pressure from inlet conduit 166 into reverse position control conduit 127 and into motor chamber 188. This causes piston 174 to be displaced to the right in Figure 7. When this occurs, shaft 33 through fork 118, shifts clutch collar 112 to the right in Figure 7 to mesh teeth 115 with teeth 117 to effect the reverse position drive.

When transmission reverse shift rail 129 is moved to the left in Figure 6, which occurs when neutral is selected in transmission 10, upper ball 163 remains for a while on face 134 but lower ball 163 rides down on face 135 onto flat face 140 so that lower plunger 155 moves toward the rail to seat valve element 151 and connect conduit 127 and motor chamber 188 to atmosphere. Spring 180 returns the piston 174 and the clutch shift mechanism to the neutral position as shown in Figure 7. At this time both motor chambers are vented to atmosphere because of the axial overlapping of face 134 and of the flat portion 140 on the rail.

Moving shift rail 129 still farther to the left in Figure 6, which occurs when shifting transmission 10 into reverse, causes upper ball 163 to ride up face 133 onto the full diameter of rail 129, lower ball 163 meanwhile remaining on flat surface 140, and the upper valve element 151 is unseated to thereby connect air under pressure to conduit 126 and motor chamber 194, while the exhaust is closed. This moves shift shaft 33 and fork 118 to the left in Figure 7, thereby causing teeth 115 to mesh with teeth 116 and effecting a forward drive connection in the transfer case shift mechanism.

It will be seen that if vacuum is utilized as the power source instead of compressed air, the control valve assembly 14 is reversed in its functions and lines 126 and 127 of Figure 5 must be reversed in their connections.

When piston 174 is moved to the left in Figure 7, retainer 182 remains seated on crosshead 171, the hollow end portion of the piston enveloping it, and spring 179 is compressed. Meanwhile retainer 183 and spring 180 are carried to the left with piston 174 due to the snap ring 185 holding retainer 183. When movement of piston 174 is to the right in Figure 7, the reverse is true. It will thereby be seen that the centering of piston 174 is caused by springs 180 and 182 attemping to return to the central neutral position shown in Figure 7.

Again in this embodiment, as in Figure 4, the loss of fluid pressure (or vacuum) causes clutch collar 112 to be shifted to the neutral position.

It is understood that this invention is not limited to air pressure or vacuum operation, it being possible to substitute for control valve assembly 125 a cylinder utilizing a sealed hydraulic system to effect shifting. In either case, relatively immovable fluid conducting lines such as conduits 126 and 127 will replace the conventional levers, linkages and springs connecting the reverse shift rail to the clutch shift shaft in the transfer case.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a vehicle having a variable speed main transmission and an auxiliary transmission, a shaft adapted to be driven from said auxiliary transmission, oppositely directed unidirectional drive members on said shaft, a clutch in said auxiliary transmission for selective clutching engagement with said connecting unidirectional drive members on said shaft for drive in opposite directions, a fluid pressure operated motor operably connected to said clutch, a control valve for said motor, a member on said main transmission having one position when said main transmission is actuated to drive the vehicle forwardly and another position only when said main transmission is actuated to drive the vehicle reversely, and means operably connecting said member and said valve.

2. In the vehicle defined in claim 1, means in said motor normally biasing said motor for maintaining said clutch in forward drive position except when said main transmission is shifted into reverse.

3. In a multi-axle drive mechanism for automotive vehicles, a change speed transmission, a transfer case connected to the output of said transmission and operatively connected to the vehicle axles, a shift rail in said transmission movable from a first position for forward drive to a second position for reverse drive, a clutch shift member on said transfer case having first and second positions, a motor having a fluid pressure responsive element connected to said clutch shift member and operable to position said clutch shift member in its first or second positions, a fluid pressure supply line connected to said motor, and a valve in said supply line operably connected to said clutch shift member to selectively control the fluid pressure in said supply line to actuate said element to position said clutch shift member.

4. In a multi-axle drive mechanism for automotive vehicles, a change speed transmission and a transfer case operably connected thereto and operable to drive the vehicle axles, a reciprocable shift rail in said transmission movable from a first position for forward drive to a second position for reverse drive, a clutch shift rod on said transfer case having first and second positions, a motor having a fluid pressure responsive element connected to said clutch shift rod and operable to position said rod in its first and second positions, a fluid pressure supply line connected to said motor, a motor control valve in said supply line, and means operated by said shift rail for actuating said valve.

5. In the drive mechanism defined in claim 4, an operating stem projecting from said valve, and a cam on said rail adapted to engage and move said stem when the transmission is shifted into reverse.

6. In a vehicle drive mechanism, a main transmission having a reciprocable shift rail, an auxiliary transmission connected to the main transmission output and having a front axle drive shaft and a clutch alternatively operative to impart forward or reverse drive to said shaft, a fluid pressure operated motor operably connected to said clutch for controlling such alternative operation and a motor control valve operably connected for actuation by said rail for controlling the energization of said motor.

7. In a vehicle drive mechanism, a main transmission having a reciprocable shift rail, an auxiliary transmission connected to the output of said main transmission, a front axle drive shaft, a clutch in said auxiliary transmission alternatively operative to drive said shaft in either a forward or reverse direction, a motor having a fluid pressure responsive element connected to said clutch, a source of fluid under pressure, fluid pressure supply lines connected to opposite sides of said element and a control valve in one of said lines adapted to be actuated by said rail.

8. In the vehicle drive mechanism defined in claim 7, said valve being normally conditioned to block transmission of fluid under pressure therethrough and to connect one side of the motor to atmosphere, and being actuated by shift of said rail when reverse is selected in said main transmission to conduct fluid under pressure to said one side of the motor and to close the connection to atmosphere.

9. In an automotive drive mechanism, a change speed transmission, a transfer case driven thereby and having an output shaft, clutch means in said transfer case operable to connect said output shaft in drive relation in said driven transfer case in either direction, a shift member on said transfer case connected to position said clutch means, a motor having a pressure responsive element connected to said shift member, springs in said motor operable to center said element in the absence of superatmospheric fluid pressure on opposite sides, a source of fluid pressure connected by supply lines to opposite sides of said element, a reciprocable shift rail in said transmission, and a valve in said fluid pressure connections operatively connected to said shift rail and controlled thereby to selectively connect said source of fluid pressure to either side of said element.

10. In an automotive drive mechanism, a change speed transmission, a transfer case driven thereby and having an output shaft, clutch means in said transfer case operable to connect said output shaft in drive relation in said driven transfer case in either direction or to disengage it, a first shift rod in said transfer case connected to position said clutch means, a piston connected to operate said shift rod, spring means operable to center said piston when the fluid pressure is equal on both sides, a source of fluid pressure connected to opposite sides of said piston, a second shift rail in said transmission, a pair of valves in said fluid pressure connections and operatively connected to said second shift rail and controlled thereby to selectively connect said source of fluid pressure to either side of said piston or to disconnect said supply from both sides of said piston, and a vent to atmospheric pressure in each of said valves, each operable to vent a side of the piston to atmosphere when disconnected from said fluid pressure source.

11. In automotive drive mechanism, a change speed main transmission and an auxiliary transmission driven thereby in a power train, a shaft driven from the auxiliary transmission and a clutch selectively operable to connect said shaft for drive in opposite directions, a fluid pressure responsive motor controlled from said main transmission and coupled to said clutch, a source of power connected to said motor, and means for shifting said clutch to neutral position in the absence of power from said source.

12. In a vehicle drive train, a drive member mounted for movement between alternative drive positions and having a neutral position intermediate said drive positions, a fluid motor having a movable member drive connected to said drive member and actuable by the application of fluid pressure to one side of said movable member to shift said drive member to one of its said drive position and by the application of equal fluid pressure to both sides of said movable member to shift said drive member to the other of its drive positions, and means for automatically restoring said member to its neutral position in the absence of the application of fluid pressure to the movable member of said motor.

13. In a vehicle drive train, a drive member mounted for movement between alternative drive positions and having a neutral position intermediate said drive positions, a fluid motor drive connected to said drive member and actuable by the application of fluid pressure thereto to shift said drive member to either of its said drive positions, said fluid motor including an element movable between limit positions and having opposed pressure faces the effective area of one of which is greater than the effective area of the other, fluid connections for applying fluid pressure to said opposed faces whereby upon application of fluid pressure solely to the face of smaller effective area said element will be moved to one of its limit positions and upon application of fluid pressure simultaneously to both faces said element will be moved to the other of its limit positions, and means for automatically restoring said element to an intermediate position in the absence of the application of fluid pressure to either face of said element.

14. The combination in claim 13 wherein said means includes a single compression spring coaxially aligned with said element.

15. In a vehicle drive train, a drive member mounted for movement between alternative drive positions and having a neutral position intermediate said drive positions, a fluid motor drive connected to said drive member and actuable by the application of fluid pressure thereto to shift said drive member to either of its said drive positions, said fluid motor including a casing, a pressure responsive element movable between limit positions within said casing and having opposed pressure faces of differential effective area, and a resilient member for positioning said element in a neutral position intermediate said limit positions, means normally operative to apply fluid pressure to the one of said opposed faces of smaller effective area to shift said element to one of its limit positions, and means for selectively applying a like fluid pressure to the other of said opposed faces to shift said element to its opposite limit position upon the application of such pressure to said other face.

16. In a multi-axle drive mechanism for automotive vehicles including a change speed transmission and a transfer case, a first shift rod in said transmission selectively movable to a plurality of different positions, a second shift rod on said transfer case movable between two limit positions, fluid pressure responsive means operable to selectively move said second shift rod to said limit positions, and fluid pressure control means actuated by said first shift rod to control the selective application of fluid pressure to said fluid pressure responsive means in response to movements of said first shift rod to position said second shift rod in one of its limit positions so long as said first shift rod is not in one of its said two positions and to shift said second shift rod to the other of its limit positions only when said first shift rod is in its said one position.

17. In a multi-axle drive mechanism for automotive vehicles including a change speed mechanism and a transfer case, a first shift rod in said transmission selectively movable to at least two different positions, a second shift rod on said transfer case movable between two limit positions, fluid pressure responsive means operable to selectively move said second shift rod to said positions, fluid pressure control means actuated by said first shift rod to control the selective application of fluid pressure to said fluid pressure responsive means in response to movements of said first shift rod to position said second shift rod in one of its limit positions so long as said first shift rod is not in one of its said two limit positions and to shift said second shift rod to the other of its limit positions only when said first shift rod is in its said one position, and means for resiliently biasing said shift rod to an intermediate position in the absence of the application of fluid pressure to said fluid pressure responsive means.

18. In a vehicle drive mechanism, a main transmission having a reciprocable shift rail, an auxiliary transmission connected to the main transmission output and having a front axle drive shaft and a clutch alternatively operative to impart forward or reverse drive to said front axle drive shaft, a fluid pressure operated motor operably connected to said clutch for controlling such alternative operation, means including said motor effective to normally maintain said clutch in forward drive connection to said front axle drive shaft, and a motor control valve operably connected for selective actuation by said shift rail to effectively energize said motor to shift said clutch into reverse drive connection with said front axle drive shaft only when said main transmission is shifted into reverse.

19. In a vehicle drive train, a drive member mounted for movement between a first and more usual operative position and a second and less usual operative position, means resiliently biasing said drive member to a third and inoperative position intermediate said first and second positions, a first fluid pressure responsive means operative when energized by fluid pressure to shift said drive member to its first said position in opposition to said resiliently biasing means, means for connecting said first fluid pressure responsive means to a source of fluid pressure to energize said first fluid pressure responsive means, a second fluid pressure responsive means operative when energized by fluid pressure to shift said drive member to its second position in opposition to both said resiliently biasing means and said first fluid pressure responsive means while said first fluid pressure responsive means is energized, and means for selectively connecting said second fluid pressure responsive means to a source of fluid pressure to selectively energize said second fluid pressure responsive means to shift said drive member from said first to said second position.

20. In a vehicle drive train, a drive member mounted for movement between a first and more usual operative position and a second and less usual operative position, means resiliently biasing said drive member to a third and inoperative position intermediate said first and second positions, a first fluid pressure responsive means operative when energized by fluid pressure to shift said drive member to its first said position in opposition to said resiliently biasing means, a source of fluid pressure, means for connecting said first fluid pressure responsive means to said source of fluid pressure to energize said first fluid pressure responsive means, a second fluid pressure responsive means operative when energized by fluid pressure to shift said drive member to its second position in opposition to both said resiliently biasing means and said first fluid pressure responsive means when said first fluid pressure responsive means is energized, and means for selectively connecting said second fluid pressure responsive means to said source of fluid pressure to selectively energize said second fluid pressure responsive means and shift said drive member from said first to said second position.

21. In a vehicle having a variable speed main transmission and an auxiliary transmission, a shaft adapted to be driven from said auxiliary transmission, oppositely directed uni-directional drive members on said shaft, a clutch in said auxiliary transmission for selective clutching engagement with said connecting uni-directional drive members on said shaft for drive in opposite directions, means resiliently biasing said clutch to an inoperative position intermediate its positions of engagement with said uni-directional drive members, a first fluid pressure responsive means operative when energized by fluid pressure to shift said clutch to a position in driving engagement with one of said uni-directional drive members in opposition to said resiliently biasing means, means for connecting said first fluid pressure responsive means to a source of fluid pressure to energize said first fluid pressure responsive means, a second fluid pressure responsive means connected to said clutch and operative when energized by fluid pressure to shift said clutch to a second position of engagement with the other of said uni-directional drive members in opposition to both said resiliently biasing means and said first fluid responsive means while said first fluid pressure responsive means is energized, and means for selectively connecting said fluid pressure responsive means to a source of fluid pressure to selectively energize said second fluid pressure responsive means.

References Cited in the file of this patent

UNITED STATES PATENTS

| | | |
|---|---|---|
| 1,943,694 | Padgett | Jan. 16, 1934 |
| 2,009,133 | Gerst | July 23, 1935 |
| 2,124,507 | Hodgkins | July 19, 1938 |
| 2,161,153 | Gallun et al. | June 6, 1939 |
| 2,328,291 | Osborne | Aug. 31, 1943 |
| 2,445,716 | Sternberg | July 20, 1948 |
| 2,479,183 | Peterson et al. | Aug. 16, 1949 |
| 2,491,087 | Cardwell et al. | Dec. 13, 1949 |
| 2,510,697 | Jacoby | June 6, 1950 |
| 2,529,393 | Hogue | Nov. 7, 1950 |
| 2,582,895 | Young | Jan. 15, 1952 |
| 2,637,221 | Backus | May 5, 1953 |